(12) United States Patent
Kim

(10) Patent No.: US 12,234,838 B2
(45) Date of Patent: Feb. 25, 2025

(54) TURBO COMPRESSOR COMPRISING BEARING COOLING CHANNEL

(71) Applicant: TNE KOREA CO., LTD., Cheongju-si (KR)

(72) Inventor: Kyeong Su Kim, Daejeon (KR)

(*) Notice: Subject to any disclaimer, the term of this patent is extended or adjusted under 35 U.S.C. 154(b) by 0 days.

(21) Appl. No.: 18/277,419

(22) PCT Filed: Jan. 20, 2022

(86) PCT No.: PCT/KR2022/001019
§ 371 (c)(1),
(2) Date: Aug. 16, 2023

(87) PCT Pub. No.: WO2022/181997
PCT Pub. Date: Sep. 1, 2022

(65) Prior Publication Data
US 2024/0301895 A1    Sep. 12, 2024

(30) Foreign Application Priority Data
Feb. 24, 2021   (KR) .................. 10-2021-0025039

(51) Int. Cl.
*F04D 29/58*   (2006.01)
*F04D 17/10*   (2006.01)
(Continued)

(52) U.S. Cl.
CPC .......... F04D 29/584 (2013.01); F04D 17/10 (2013.01); F04D 29/0513 (2013.01); F04D 29/4206 (2013.01)

(58) Field of Classification Search
CPC ........ F04D 17/10; F04D 25/082; F04D 29/04; F04D 29/0513; F04D 29/4206;
(Continued)

(56) References Cited

U.S. PATENT DOCUMENTS 4,125,345 A * 11/1978 Yoshinaga .......... F04D 25/0606
417/244
9,863,430 B2 * 1/2018 Lee .................. H01M 8/04089
(Continued)

FOREIGN PATENT DOCUMENTS

JP           4932921 B2    5/2012
KR   10-2018-0118455 A   10/2018
(Continued)

*Primary Examiner* — Brian P Wolcott
(74) *Attorney, Agent, or Firm* — KORUS Patent, LLC; Seong Il Jeong

(57) ABSTRACT

Provided is a turbo compressor including a compressed gas inlet through which a gas is sucked in, an impeller for compressing the gas introduced through the compressed gas inlet, a compressed gas outlet through which the gas compressed by the impeller is discharged to the outside, a compression unit including a compressed gas channel connected from the compressed gas inlet to the compressed gas outlet, a motor including a rotating shaft having an end coupled to the impeller, to rotate the impeller, a housing including a motor accommodation space for accommodating the motor, a cooling air channel provided to pass through the motor accommodation space and formed to circulate a cooling gas accommodated therein, a cooling water channel formed to circulate a cooling liquid capable of cooling the housing, and thrust bearings disposed at an end of the rotating shaft, wherein the cooling water channel includes bearing cooling water channels disposed within a predetermined distance from the thrust bearings to cool the thrust bearings. According to the present invention, the thrust bearings supporting the rotating shaft and the cooling gas accommodated in front air channels adjacent to the bearing cooling water channels may be very rapidly cooled.

10 Claims, 11 Drawing Sheets

(51) Int. Cl.
  *F04D 29/051* (2006.01)
  *F04D 29/42* (2006.01)
(58) Field of Classification Search
  CPC ............... F04D 29/584; F04D 29/5806; F04D 29/5846–5853
  See application file for complete search history.

(56) References Cited

U.S. PATENT DOCUMENTS

| | | | | |
|---|---|---|---|---|
| 11,009,043 | B2* | 5/2021 | Kim | F04D 29/5806 |
| 11,143,204 | B2* | 10/2021 | Park | F04D 25/024 |
| 11,248,612 | B2* | 2/2022 | Sakota | F04D 29/057 |
| 11,339,800 | B2* | 5/2022 | Sakota | F01D 17/141 |
| 11,639,724 | B2* | 5/2023 | Kim | F04D 29/28 |
| | | | | 415/175 |
| 2011/0243762 | A1* | 10/2011 | Daikoku | F02B 33/40 |
| | | | | 384/105 |
| 2015/0308456 | A1* | 10/2015 | Thompson | F04D 17/12 |
| | | | | 417/244 |
| 2019/0293085 | A1* | 9/2019 | Kim | F04D 29/58 |

FOREIGN PATENT DOCUMENTS

| | | |
|---|---|---|
| KR | 10-2019-0002972 A | 1/2019 |
| KR | 10-2019-0109886 A | 9/2019 |
| WO | 2019/087868 A1 | 5/2019 |

* cited by examiner

Prior Art

TURBO COMPRESSOR COMPRISING BEARING COOLING CHANNEL

TECHNICAL FIELD

The present invention relates to a turbo compressor, and more particularly, to a turbo compressor capable of very rapidly cooling thrust bearings supporting a rotating shaft and a cooling gas accommodated in front air channels adjacent to bearing cooling water channels.

BACKGROUND ART

A turbo compressor or turbo blower is a centrifugal pump that sucks in and compresses external air or gas and then blows out the compressed air or gas by rotating an impeller at high speed, and is commonly used to transfer powder or for aeration at sewage treatment plants and also currently used for industrial processes and vehicles.

In the turbo compressor, high frictional heat is unavoidably generated by a motor and bearings to rotate an impeller at high speed and thus cooling of main heat sources such as the motor and the bearings is required.

An example of an existing turbo compressor is shown in FIG. 1. An existing turbo compressor 1 includes a motor 3 mounted in a housing 2, a rotating shaft 4 rotated by the motor 3, a pair of journal bearings 5 supporting the rotating shaft 4, thrust bearings 6 supporting a rear end of the rotating shaft 4, a cooling fan 7 for forcibly circulating a cooling gas G accommodated in a cooling air channel 8, and an impeller 9 coupled to a front end of the rotating shaft 4.

The existing turbo compressor 1 has a circulation structure in which the cooling gas G circulated along the cooling air channel 8 by the cooling fan 7 cools the motor 3 and the bearings 5 and 6 and then returns to the cooling fan 7.

However, in the existing turbo compressor 1, because the thrust bearings 6 need to withstand a relatively high axial load produced by the impeller 9, a thrust runner having an appropriate size, i.e., a relatively large radius, is required, a tip speed of the thrust runner is excessively increased at high-speed rotation, and thus windage loss of the impeller 9 is increased.

Furthermore, in the existing turbo compressor 1, due to the relatively high axial load applied to the thrust bearings 6, the thrust bearings 6 generate heat at least five times the heat generated by the journal bearing, and the breakdown of the thrust bearings 6 may noticeably reduce the life of the turbo compressor.

In the existing turbo compressor 1, although the cooling gas G accommodated in the cooling air channel 8 cools the thrust bearings 6, the heat generated by the thrust bearings 6 may not be sufficiently removed.

In the existing turbo compressor 1, because the cooling gas G may not cool the inside of the rotating shaft 4 but cools only the surface of the rotating shaft 4, serious thermal expansion of the rotating shaft 4 may occur. In addition, because the thrust bearings 6 are disposed at the rear end of the rotating shaft 4 opposite to the impeller 9, a sufficiently large gap between blades of the impeller 9 and the housing 10 needs to be ensured when the turbo compressor 1 is manufactured in consideration of thermal expansion of the rotating shaft 4 during operation, and thus the performance of the impeller 9 may deteriorate.

DETAILED DESCRIPTION OF THE INVENTION

Technical Problem

The present invention provides a turbo compressor with an improved structure to very rapidly cool thrust bearings supporting a rotating shaft and a cooling gas accommodated in front air channels adjacent to bearing cooling water channels.

Technical Solution

According to an aspect of the present invention, there is provided a turbo compressor capable of compressing a gas and supplying the compressed gas to outside, the turbo compressor including a compressed gas inlet through which the gas is sucked in, an impeller for compressing the gas introduced through the compressed gas inlet, a compressed gas outlet through which the gas compressed by the impeller is discharged to the outside, a compression unit including a compressed gas channel connected from the compressed gas inlet to the compressed gas outlet, a motor including a rotating shaft having an end coupled to the impeller, to rotate the impeller, a housing including a motor accommodation space for accommodating the motor, a cooling air channel provided to pass through the motor accommodation space and formed to circulate a cooling gas accommodated therein, a cooling water channel formed to circulate a cooling liquid capable of cooling the housing, and thrust bearings disposed at an end of the rotating shaft, wherein the cooling water channel includes bearing cooling water channels disposed within a predetermined distance from the thrust bearings to cool the thrust bearings.

The bearing cooling water channels may extend by a predetermined length along radial directions of the rotating shaft to allow the cooling liquid to flow along the radial directions of the rotating shaft.

The rotating shaft may include a thrust bearing runner corresponding to the thrust bearings, and the bearing cooling water channels may be provided in a position and shape corresponding to the thrust bearing runner.

The turbo compressor may further include a journal bearing disposed between the impeller and the thrust bearings as a bearing supporting the rotating shaft, and the journal bearing may be disposed under the bearing cooling water channels.

The thrust bearings and the journal bearing may be air bearings.

The cooling air channel may include air channels penetrating through the housing to cool the housing, and the cooling water channel may include water channels penetrating through the housing to cool the housing.

The cooling water channel may be provided to exchange heat with the cooling gas accommodated in the cooling air channel, and the air channels penetrating through the housing and the water channels penetrating through the housing may extend along a longitudinal direction of the rotating shaft and alternately disposed along a circumferential direction of the rotating shaft.

The rotating shaft may include a hollow extending along a longitudinal direction, and the cooling air channel may include an air channel penetrating through the hollow of the rotating shaft.

The rotating shaft may include a plurality of members including a hollow extending along a longitudinal direction, and a tie bolt extending along the longitudinal direction of the rotating shaft to sequentially penetrate through the hollow of the plurality of members and to detachably couple the plurality of members to the impeller.

The compressed gas channel may be spatially separate from the cooling air channel to prevent the gas inside the compressed gas channel from penetrating into the cooling air channel, and the turbo compressor may further include a cooling fan for forcibly circulating the cooling gas accommodated in the cooling air channel.

The cooling fan may be disposed at a rear end of the rotating shaft and rotated by torque of the rotating shaft.

The cooling air channel may include an air channel through which the gas is discharged to a front side of the impeller after penetrating through the hollow of the rotating shaft.

Advantageous Effects

According to the present invention, a turbo compressor includes a compressed gas inlet through which a gas is sucked in, an impeller for compressing the gas introduced through the compressed gas inlet, a compressed gas outlet through which the gas compressed by the impeller is discharged to the outside, a compression unit including a compressed gas channel connected from the compressed gas inlet to the compressed gas outlet, a motor including a rotating shaft having an end coupled to the impeller, to rotate the impeller, a housing including a motor accommodation space for accommodating the motor, a cooling air channel provided to pass through the motor accommodation space and formed to circulate a cooling gas accommodated therein, a cooling water channel formed to circulate a cooling liquid capable of cooling the housing, and thrust bearings disposed at an end of the rotating shaft, the cooling water channel includes bearing cooling water channels disposed within a predetermined distance from the thrust bearings to cool the thrust bearings, and thus the thrust bearings supporting the rotating shaft and the cooling gas accommodated in front air channels adjacent to the bearing cooling water channels may be very rapidly cooled.

BEST MODE

Hereinafter, the present invention will be described in detail by explaining embodiments of the invention with reference to the attached drawings.

Figure 1:
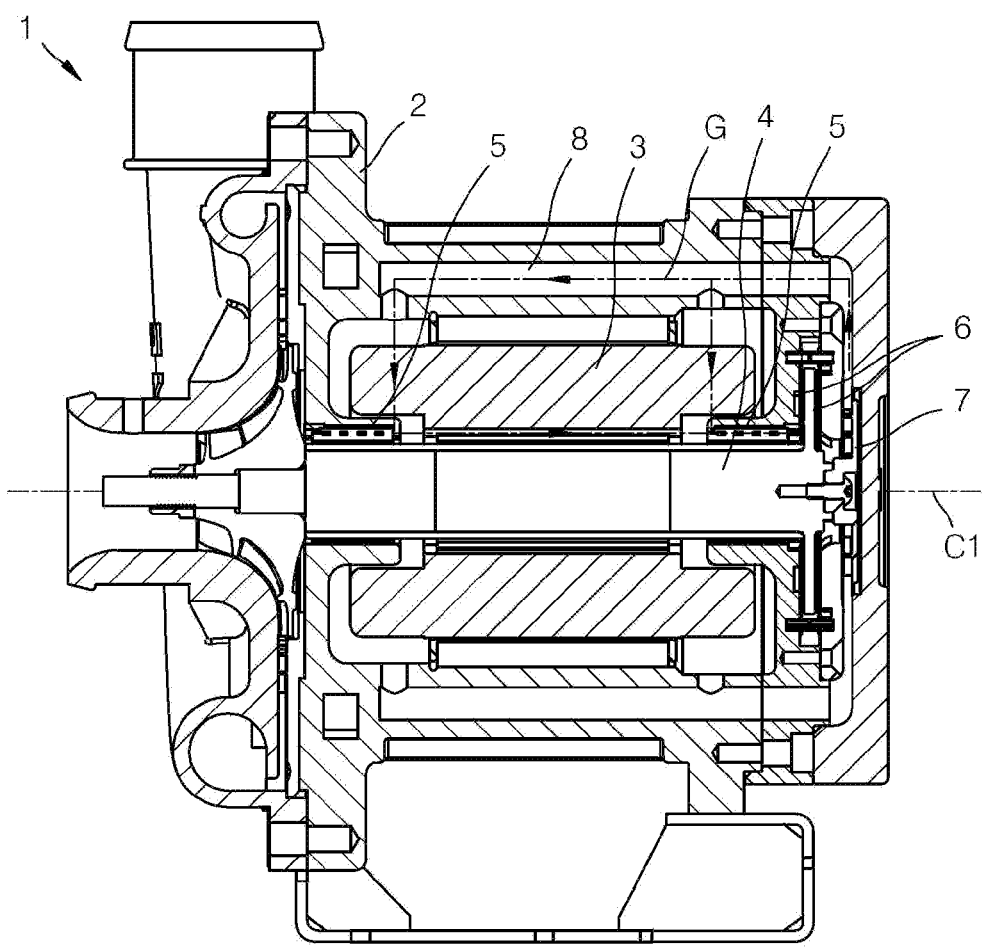
FIG. 1 is a cross-sectional view of an existing turbo compressor.
Figure 2:
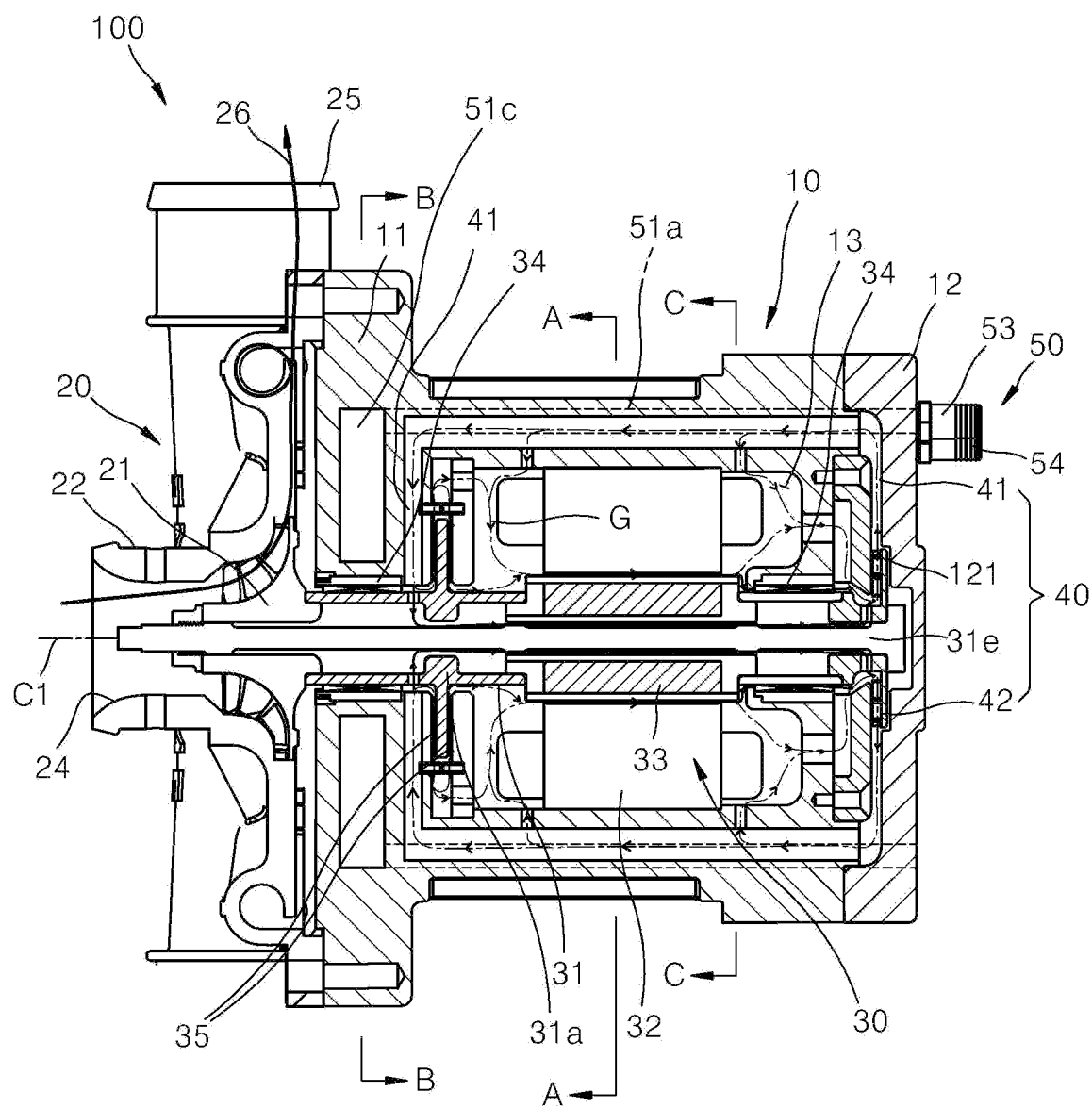
FIG. 2 is a cross-sectional view of a turbo compressor according to an embodiment of the present invention.
Figure 3:
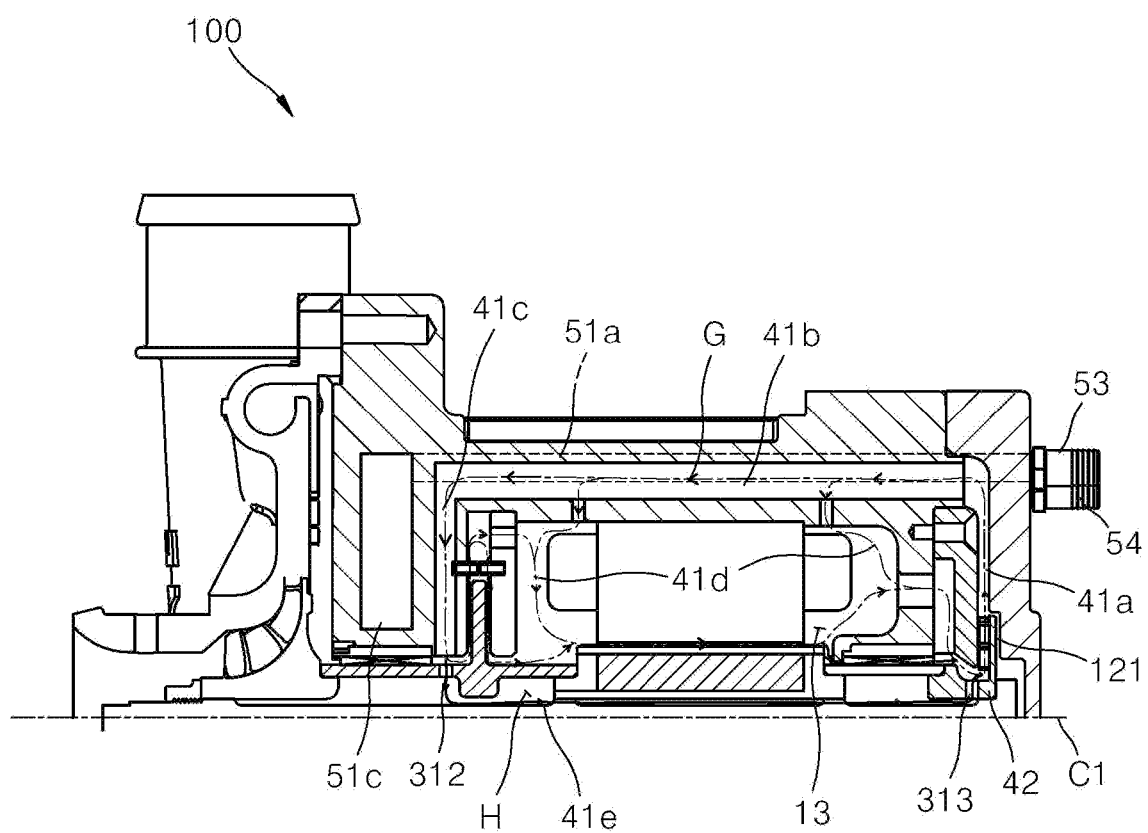
FIG. 3 is a partially enlarged view of the turbo compressor illustrated in FIG. 2.
Figure 4:
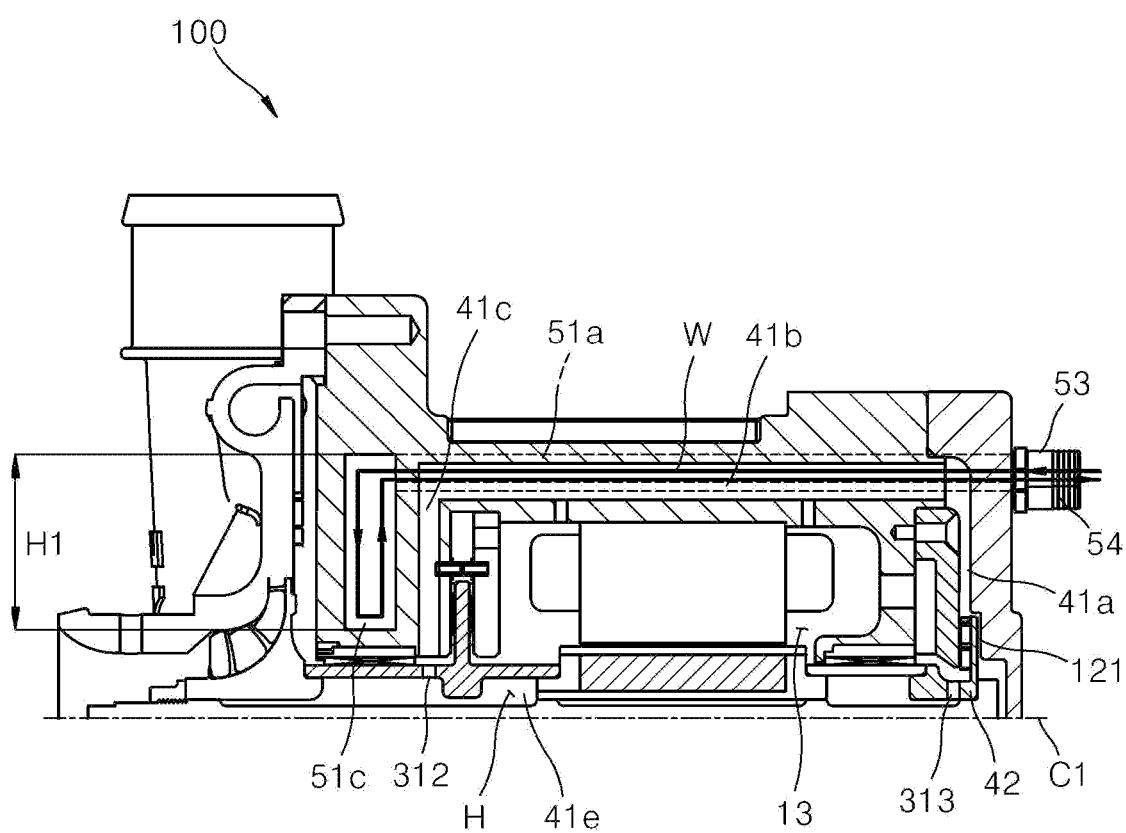
FIG. 4 is a partially enlarged view of the turbo compressor illustrated in FIG. 2 and shows the flow of a cooling liquid.

FIG. 2 is a cross-sectional view of a turbo compressor according to an embodiment of the present invention, FIG. 3 is a partially enlarged view of the turbo compressor illustrated in FIG. 2, and FIG. 4 is a partially enlarged view of the turbo compressor illustrated in FIG. 2 and shows the flow of a cooling liquid.

Referring to FIGS. 2 to 4, a turbo compressor 100 according to an embodiment of the present invention is a centrifugal pump that sucks in and compresses an external gas and then blows the compressed gas to the outside by rotating an impeller at high speed, and is also called a turbo compressor or a turbo blower. The turbo compressor 100 includes a housing 10, a compression unit 20, a motor 30, an air cooling unit 40, and a water cooling unit 50. The following description assumes that the gas to be compressed is air.

The housing 10 is a housing made of a metal material, is a cylindrical member including a motor accommodation space 13 therein, has a cross-section with a first central axis C1 as the center of a circle, and extends along the first central axis C1.

The motor accommodation space 13 is a space having a shape corresponding to the motor 30 described below to accommodate the motor 30.

As shown in FIG. 2, an impeller 21 of the compression unit 20 is disposed at a front end 11 of the housing 10, and a cooling fan mounting hole 121 is provided at a rear end 12 of the housing 10.

The housing 10 is provided as a plurality of separate components to mount the motor 30 therein, but a detailed description thereof is not provided herein.

The compression unit 20 is a device for sucking in and compressing external air, and includes the impeller 21 and a front cover 22.

The impeller 21 is a main component of the centrifugal pump, is a wheel including a plurality of curved blades, and is mounted to rotate at high speed.

The front cover 22 is a metal member disposed in front of the impeller 21, and is provided with a compressed gas inlet 24 through which the external air is sucked in.

The front cover 22 is provided in the form of a scroll case including channels through which the air having passed through the impeller 21 may flow in a spiral shape.

The impeller 21 compresses the air introduced through the compressed gas inlet 24, and the air compressed by the impeller 21 is discharged to the outside through a compressed gas outlet 25 as shown in FIG. 2.

The air sucked into the compressed gas inlet 24 is compressed while moving along a compressed gas channel 26 connected from the compressed gas inlet 24 to the compressed gas outlet 25.

The motor 30 is an electric motor for generating torque and is a device for supplying high-speed torque to the impeller 21. The motor 30 includes a rotating shaft 31, a stator 32, a rotor 33, journal bearings 34, and thrust bearings 35.

The rotating shaft 31 is a rod member extending along the first central axis C1, and a front end thereof is relatively non-rotatably coupled to the impeller 21 to rotate the impeller 21.

Figure 9:
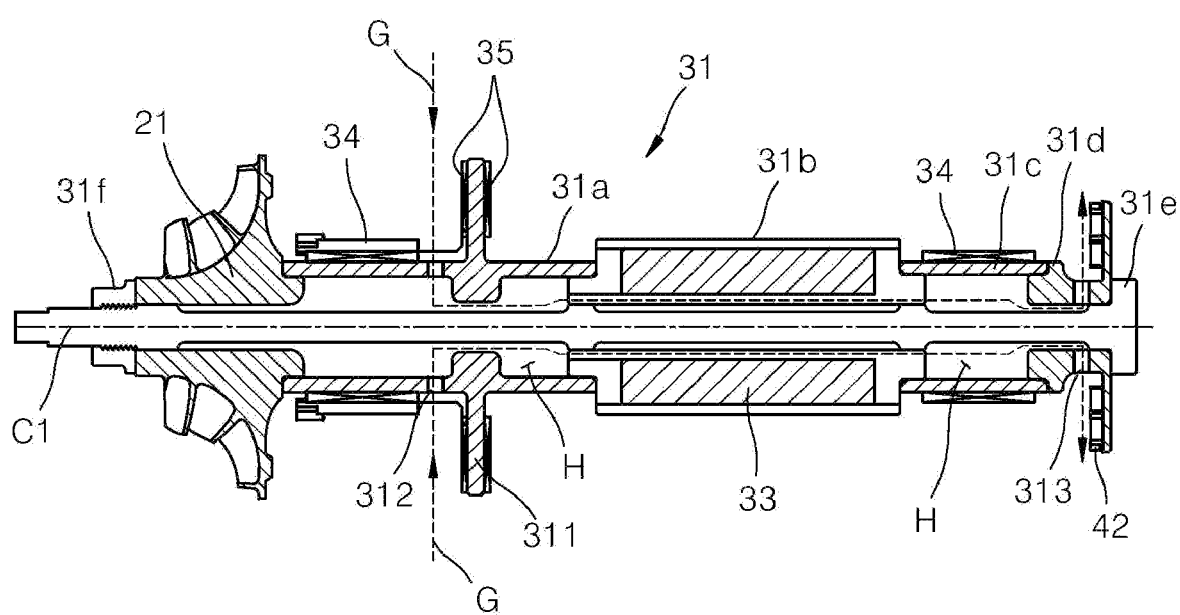
FIG. 9 is a cross-sectional view of a rotating shaft illustrated in FIG. 2 and its surroundings.

In the current embodiment, as shown in FIG. 9, the rotating shaft 31 includes a plurality of members 31a, 31b, 31c, and 31d.

The plurality of members 31a, 31b, 31c, and 31d are detachably coupled to each other by a tie bolt 31e and a nut 31f.

The plurality of members 31a, 31b, 31c, and 31d include a hollow H extending along the first central axis C1 which is a longitudinal direction of the rotating shaft 31.

The tie bolt 31e is a male screw member extending along the longitudinal direction C1 of the rotating shaft 31 and is disposed to sequentially penetrate through the hollow H of the plurality of members 31a, 31b, 31c, and 31d.

The nut 31f is a female screw member screw-coupled to a front end of the tie bolt 31e.

As shown in FIG. 9, the impeller 21 is disposed in front of the first member 31a, and a cooling fan 42 described below is coupled to the fourth member 31d.

The first member 31a is a pipe-shaped member having the hollow H, and a thrust bearing runner 311 corresponding to the thrust bearings 35 is provided around a middle portion thereof.

Figure 10:
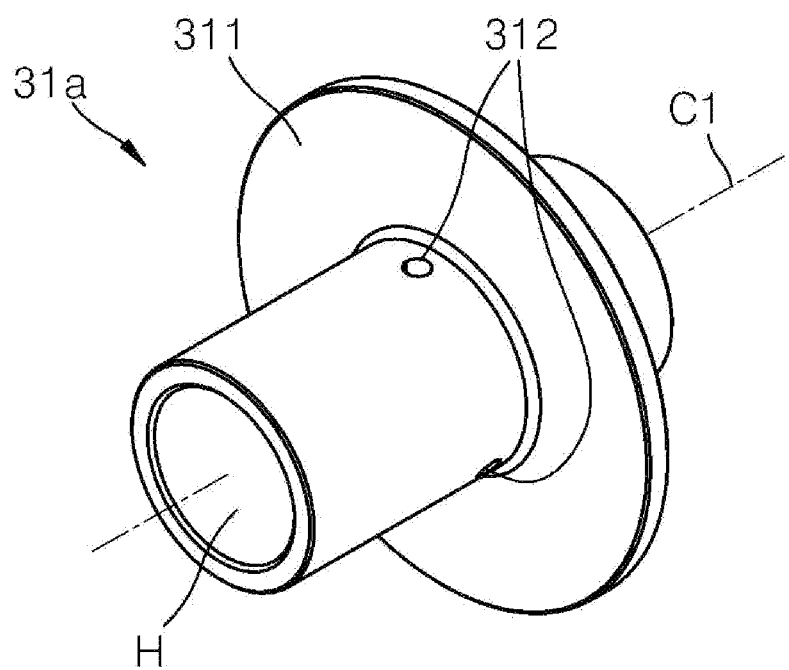
FIG. 10 is a perspective view of a first member as a portion of the rotating shaft illustrated in FIG. 2.

As shown in FIG. 10, the thrust bearing runner 311 is a disc-shaped runner.

A plurality of through-holes 312 penetrating from an outer circumferential surface to the hollow H are provided around the middle portion of the first member 31a. The through-holes 312 are holes through which a cooling gas described below passes.

The fourth member 31d is a pipe-shaped member having the hollow H, and a plurality of through-holes 313 penetrating from the outer circumferential surface to the hollow H are provided therearound. The through-holes 313 are holes through which the cooling gas described below passes.

Consequently, the rotating shaft 31 includes an inner air channel 41e formed from the through-holes 312 to the through-holes 313 through the hollow H.

The stator 32 is a stator wound with a field coil and is fixed and mounted in the motor accommodation space 13.

The rotor 33 is a rotor including a permanent magnet and is coupled to a middle portion of the rotating shaft 31.

The journal bearings 34 are journal foil air bearings rotatably supporting the rotating shaft 31 to reduce frictional force generated by high-speed rotation, and are provided at a front end and a rear end of the rotating shaft 31.

The journal bearing 34 disposed at the front end of the rotating shaft 31 is disposed between the impeller 21 and the thrust bearings 35 immediately under bearing cooling water channels 51c as shown in FIG. 4.

The thrust bearings 35 are thrust foil air bearings, and a pair of thrust bearings 35 are disposed on both surfaces of the thrust bearing runner 311.

In the current embodiment, as shown in FIG. 2, the thrust bearings 35 are disposed in front of the motor accommodation space 13.

Predetermined gaps are present between the stator 32 and the rotor 33, between the rotating shaft 31 and the stator 32, between the rotating shaft 31 and the journal bearings 34, and between the thrust bearings 35 and the thrust bearing runner 311.

The air cooling unit 40 is a device for cooling the housing 10 and the motor 30 by using a cooling gas, and includes a cooling air channel 41 and a cooling fan 42. Herein, air or an inert gas is used as the cooling gas.

The cooling air channel 41 is a passage for accommodating the cooling gas and is formed to continuously circulate the cooling gas accommodated therein.

As shown in FIG. 3, the cooling air channel 41 is provided to pass through the motor accommodation space 13 and the housing 10, and includes a rear air channel 41a, outer air channels 41b, front air channels 41c, middle air channels 41d, and an inner air channel 41e.

The rear air channel 41a is an air channel provided to allow the cooling gas to flow from the center of the rear end 12 of the housing in radial directions of the rear end 12 of the housing.

The rear air channel 41a is a disc-shaped space provided in the rear end 12 of the housing.

The outer air channels 41b are air channels penetrating through the housing 10 to cool the housing 10, and extend around the first central axis C1.

Figure 5:
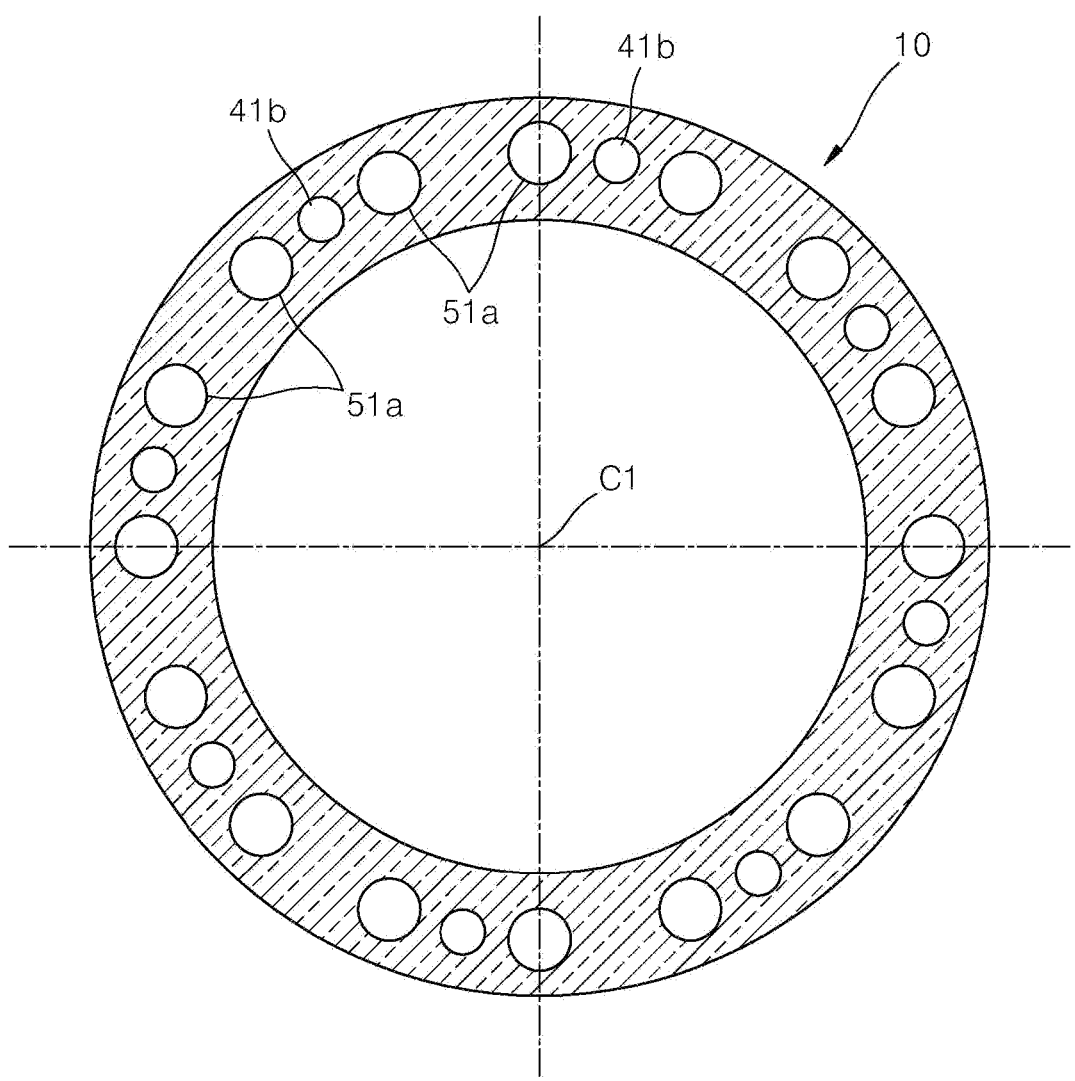
FIG. 5 is a cross-sectional view along line A-A of the turbo compressor illustrated in FIG. 2.

As shown in FIG. 5, a plurality of outer air channels 41b are arranged along a circumferential direction of the first central axis C1 and connected to the rear air channel 41a.

As shown in FIG. 3, the front air channels 41c are air channels provided to allow the cooling gas to flow from the edge of the front end 11 of the housing toward the center of the front end 11 of the housing.

The front air channels 41c include a plurality of holes 41c extending from front ends of the outer air channels 41b to the motor accommodation space 13 and penetrating through the housing 10.

The middle air channels 41d include a plurality of holes 41d extending from middle portions of the outer air channels 41b to the motor accommodation space 13 and penetrating through the housing 10.

The middle air channels 41d include air channels passing through a space between the rotating shaft 31 and the stator 32.

The middle air channels 41d are provided to allow the cooling gas to pass by the field coil of the stator 32, the outer circumferential surface of the rotating shaft 31, and the thrust bearings 35.

The inner air channel 41e is a cooling air channel provided through the hollow H of the rotating shaft 31 and formed from the through-holes 312 to the through-holes 313 through the hollow H of the rotating shaft 31.

The inner air channel 41e is connected to the front air channels 41c, the rear air channel 41a, and the middle air channels 41d.

As shown in FIG. 5, the cooling air channel 41 may be provided to be rotationally or axially symmetric about the first central axis C1.

In the current embodiment, the cooling air channel 41 is spatially separate from the compressed gas channel 26. Therefore, the air inside the compressed gas channel 26 may not leak from the compressed gas channel 26 or penetrate into the cooling air channel 41 while being compressed.

The cooling fan 42 is a cooling fan for forcibly circulating the cooling gas accommodated in the cooling air channel 41 and is mounted in the cooling fan mounting hole 121 of the inner housing 10.

In the current embodiment, the cooling fan 42 is relatively non-rotatably coupled to the rear end of the rotating shaft 31 and thus rotated by torque of the rotating shaft 31.

The water cooling unit 50 is a device for cooling the housing 10 by using a cooling liquid, and includes a cooling water channel 51, a cooling liquid inlet 53, and a cooling liquid outlet 54. Herein, water is used as the cooling liquid.

The cooling water channel 51 is a passage for accommodating the cooling liquid and is formed to continuously circulate the cooling liquid accommodated therein.

As shown in FIGS. 2 and 4, the cooling water channel 51 is provided to penetrate through the housing 10 to cool the housing 10, and includes unit water channels 51a, rear water channels 51b, and front water channels 51c.

As shown in FIG. 4, the unit water channels 51a are circular water channels penetrating through the housing 10, and extend around the first central axis C1.

A plurality of unit water channels 51a are arranged at intervals along the circumferential direction of the first central axis C1.

Figure 7:
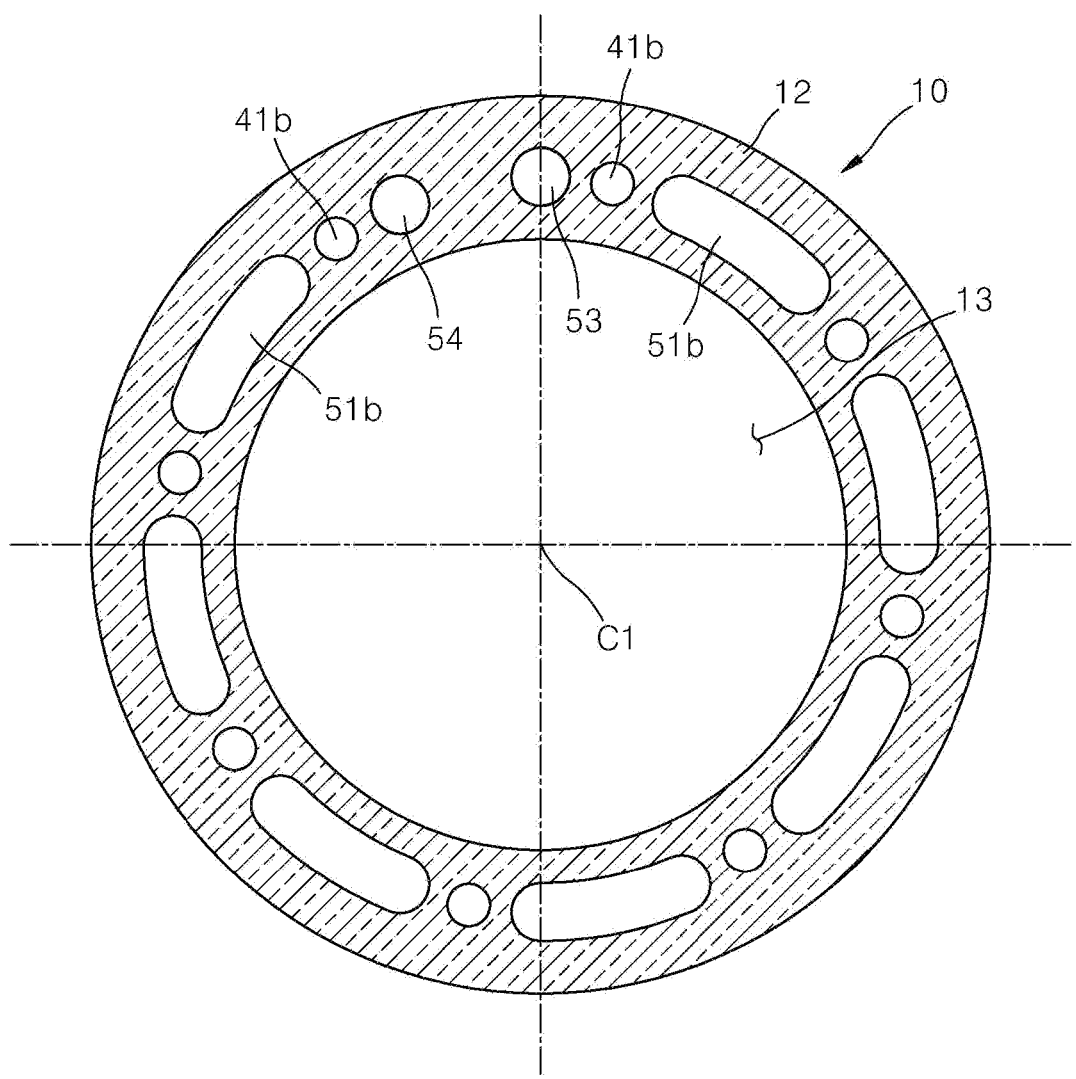
FIG. 7 is a cross-sectional view along line C-C of the turbo compressor illustrated in FIG. 2.

The rear water channels 51b are water channels for connecting rear ends of the unit water channels 51a to each other, and are formed to penetrate through the rear end 12 of the housing as shown in FIG. 7.

Figure 6:
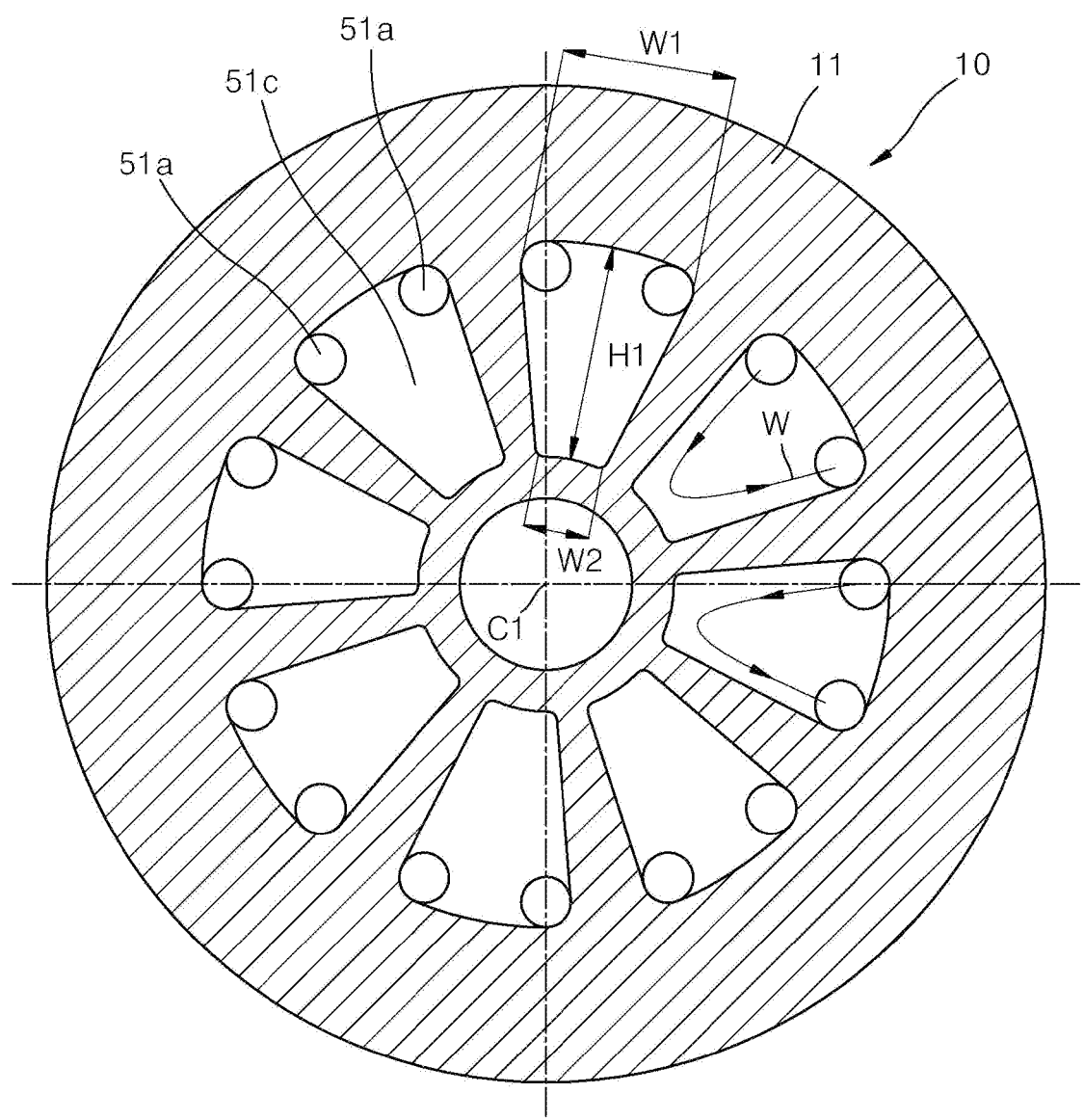
FIG. 6 is a cross-sectional view along line B-B of the turbo compressor illustrated in FIG. 2.

The front water channels 51c are water channels for connecting front ends of the unit water channels 51a to each other, and are formed to penetrate through the front end 11 of the housing as shown in FIG. 6.

In the current embodiment, as shown in FIG. 4, the front water channels 51c include bearing cooling water channels provided to cool the thrust bearings 35 more efficiently.

As shown in FIG. 4, the bearing cooling water channels 51c are disposed as close as possible to the thrust bearings 35 and the front air channels 41c within a predetermined distance.

As shown in FIG. 6, the bearing cooling water channels 51c extend by a predetermined length H1 along radial directions of the rotating shaft 31 to allow the cooling liquid to flow along the radial directions of the rotating shaft 31.

The bearing cooling water channels 51c may be provided in a position and shape corresponding to the thrust bearing runner 311.

In the current embodiment, as shown in FIG. 6, the bearing cooling water channels 51c have a fan shape with an upper width W1 greater than a lower width W2 and are arranged along the circumferential direction of the first central axis C1.

Herein, values of the upper width W1 and the radial-direction length H1 of the bearing cooling water channels 51c vary depending on the interval between adjacent unit water channels 51a.

Figure 8:
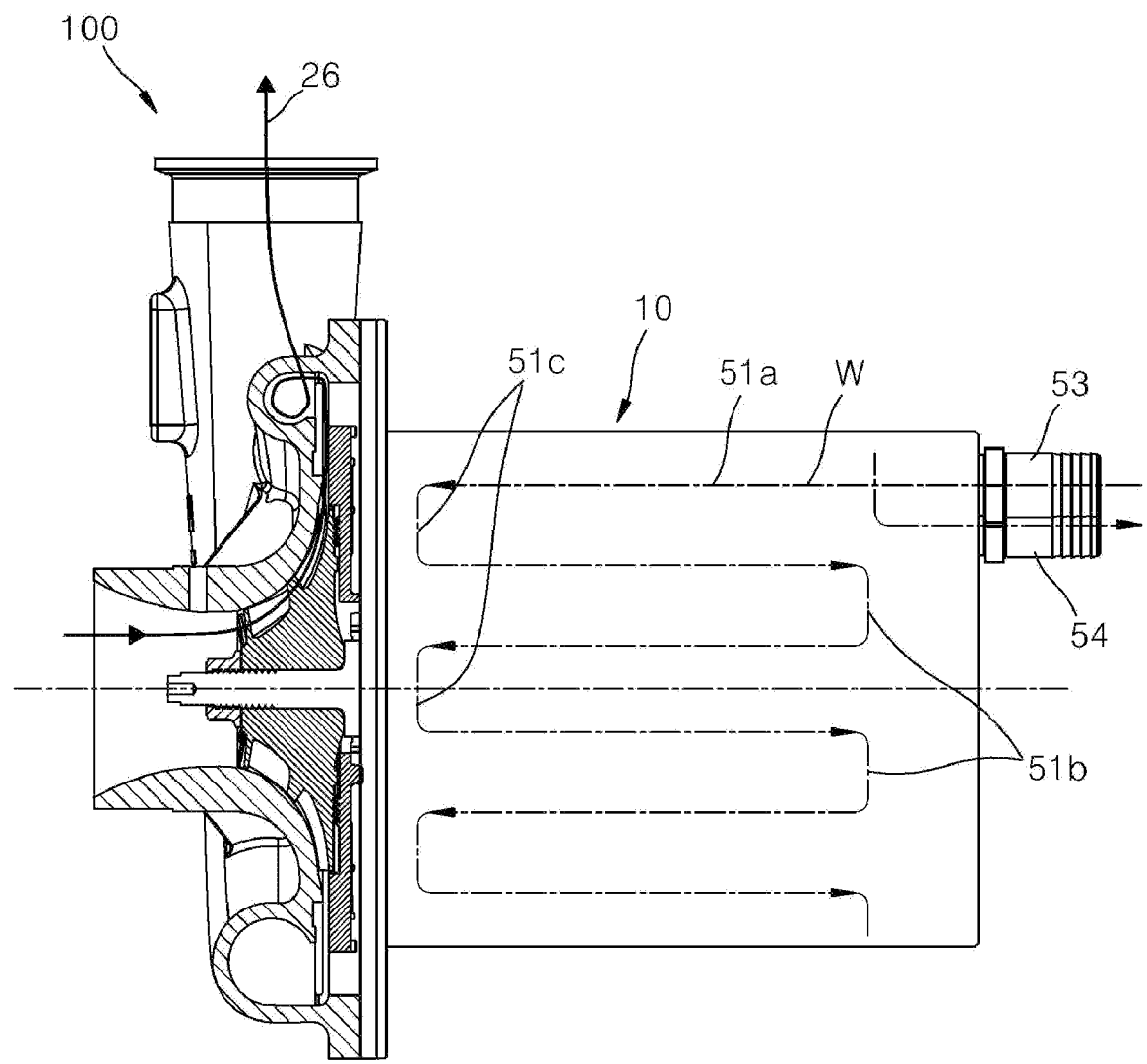
FIG. 8 is a view showing the flow of a cooling liquid of the turbo compressor illustrated in FIG. 2.

Consequently, as shown in FIG. 8, the cooling water channel 51 is formed in a zigzag shape along a circumferential direction of the housing 10 and disposed to surround the entirety of a side wall of the housing 10.

The cooling water channel 51 may be provided to be rotationally or axially symmetric about the first central axis C1.

As shown in FIG. 4, the cooling liquid inlet 53 is an inlet through which the cooling liquid is introduced from the outside, and is connected to an end of the cooling water channel 51 and provided at the rear end 12 of the housing.

The cooling liquid inlet 53 is connected to an external pump (not shown) and thus supplied with water by the pump.

The cooling liquid outlet 54 is an outlet through which the cooling liquid is discharged to the outside, and is connected to another end of the cooling water channel 51 and provided at the rear end 12 of the housing.

Meanwhile, the cooling liquid discharged from the cooling liquid outlet 54 may be cooled outside and then flow into the cooling liquid inlet 53 again.

The cooling water channel 51 may be provided to exchange heat with the cooling gas accommodated in the cooling air channel 41.

In the current embodiment, as shown in FIG. 5, the unit water channels 51a and the outer air channels 41b are alternately disposed along a circumferential direction of the rotating shaft 31 to penetrate through the housing 10.

An example of a method of operating the above-described turbo compressor 100 will now be described.

When the rotating shaft 31 of the motor 30 rotates, the impeller 21 and the cooling fan 42 rotate and the air introduced through the compressed gas inlet 24 is compressed while flowing along the compressed gas channel 26 of the compression unit 20 and discharged to the outside through the compressed gas outlet 25. In this case, because the compressed gas channel 26 is spatially separate from the cooling air channel 41, the air flowing inside the compressed gas channel 26 may not leak or penetrate into the cooling air channel 41 while being compressed. That is, a flow of the air along the compressed gas channel 26 and a flow G of the cooling gas along the cooling air channel 41 do not interfere with each other.

As shown in FIG. 3, the cooling gas accommodated in the cooling air channel 41 is forcibly circulated by the cooling fan 42 to pass through the channels 41b in the side wall of the housing 10, the front end 11 of the housing, the hollow H of the rotating shaft 31, the thrust bearings 35, the field coil of the stator 32, the rotor 33 in the rotating shaft 31, and the journal bearings 34.

As shown in FIG. 8, the cooling liquid accommodated in the cooling water channel 51 is introduced from the cooling liquid inlet 53, forms a flow W of the cooling liquid in a zigzag shape along the circumferential direction of the housing 10, and then is discharged through the cooling liquid outlet 54 after cooling the entirety of the housing 10.

In this case, the cooling gas flowing through the outer air channels 41b are rapidly cooled by the cooling liquid flowing through the unit water channels 51a adjacent to the outer air channels 41b. Particularly, because the unit water channels 51a and the outer air channels 41b are alternately disposed along the circumferential direction of the rotating shaft 31 to penetrate through the housing 10 as shown in FIG. 5, the heat exchange efficiency between the cooling liquid flowing through the unit water channels 51a and the cooling gas flowing through the outer air channels 41b is very high.

As shown in FIG. 6, in the bearing cooling water channels 51c, the cooling liquid may flow in a "U" shape to approach and then leave the rotating shaft 31 along the radial directions of the rotating shaft 31. Due to such flow W of the cooling liquid in the bearing cooling water channels 51c, the front air channels 41c and the thrust bearings 35 adjacent thereto may be very rapidly cooled.

As shown in FIG. 3, the cooling gas flowing through the front air channels 41c enters the hollow H of the rotating shaft 31 through the through-holes 312, flows along the hollow H to the rear end of the rotating shaft 31, and then exits the hollow H of the rotating shaft 31 through the through-holes 313. In this case, the rotating shaft 31 and the rotor 33 in the hollow H of the rotating shaft 31 may be very rapidly cooled.

The above-described turbo compressor 100 is a turbo compressor capable of compressing a gas and supplying the compressed gas to the outside, and includes the compressed gas inlet 24 through which the gas is sucked in, the impeller 21 for compressing the gas introduced through the compressed gas inlet 24, the compressed gas outlet 25 through which the gas compressed by the impeller 21 is discharged to the outside, the compression unit 20 including the compressed gas channel 26 connected from the compressed gas inlet 24 to the compressed gas outlet 25, the motor 30 including the rotating shaft 31 having a front end coupled to the impeller 21, to rotate the impeller 21, the housing 10 including the motor accommodation space 13 for accommodating the motor 30, the cooling air channel 41 provided to pass through the motor accommodation space 13 and formed to circulate the cooling gas accommodated therein, the cooling water channel 51 formed to circulate the cooling liquid capable of cooling the housing 10, and the thrust bearings 35 disposed at an end of the rotating shaft 31, the cooling water channel 51 includes the bearing cooling water channels 51c disposed within a predetermined distance from the thrust bearings 35 to cool the thrust bearings 35, and thus the front air channels 41c and the thrust bearings 35 adjacent to the bearing cooling water channels 51c may be very rapidly cooled.

In the turbo compressor 100, the bearing cooling water channels 51c extend by the predetermined length H1 along the radial directions of the rotating shaft 31 to allow the cooling liquid to flow along the radial directions of the rotating shaft 31, and thus the bearing cooling water channels 51c may cover a total area of the front air channels 41c and the thrust bearings 35.

In the turbo compressor 100, the rotating shaft 31 includes the thrust bearing runner 311 corresponding to the thrust bearings 35, the bearing cooling water channels 51c are provided in a position and shape corresponding to the thrust bearing runner 311, and thus a total area of the thrust bearings 35 may be uniformly and rapidly cooled.

The turbo compressor 100 further includes the journal bearing 34 disposed between the impeller 21 and the thrust bearings 35 as a bearing supporting the rotating shaft 31, the journal bearing 34 is disposed under the bearing cooling water channels 51c, and thus a space for forming the bearing cooling water channels 51c may be easily ensured in the housing 10.

In the turbo compressor 100, the thrust bearings 35 and the journal bearing 34 are foil air bearings, and thus non-contact bearings using air without mechanical friction may be easily cooled, no operation noise may be caused, and a semi-permanent lifetime may be provided.

In the turbo compressor 100, the cooling air channel 41 includes the air channels 41a, 41b, 41c, and 41d penetrating through the housing 10 to cool the housing 10, the cooling water channel 51 includes the water channels 51a, 51b, and 51c penetrating through the housing 10 to cool the housing 10, and thus the housing 10 may be rapidly cooled by using the cooling gas and the cooling liquid at the same time. In this case, the cooling water channel 51 penetrates through the housing 10 and thus the cooling efficiency may be excellent and leakage may hardly occur compared to a case of using a separate cooling pipe.

In the turbo compressor 100, the cooling water channel 51 is provided to exchange heat with the cooling gas accommodated in the cooling air channel 41, the air channels 41a, 41b, 41c, and 41d penetrating through the housing 10 and the water channels 51a, 51b, and 51c penetrating through the housing 10 extend along the longitudinal direction C1 of the rotating shaft 31 and alternately disposed along the circumferential direction of the rotating shaft 31, and thus heat may be very easily exchanged between the cooling liquid accommodated in the cooling water channel 51 and the cooling gas accommodated in the cooling air channel 41.

In the turbo compressor 100, the rotating shaft 31 includes the hollow H extending along the longitudinal direction C1, the cooling air channel 41 includes the air channel 41e penetrating through the hollow H of the rotating shaft 31, and thus the rotating shaft 31 and the rotor 33 in the hollow H of the rotating shaft 31 may be very rapidly cooled.

In the turbo compressor 100, the rotating shaft 31 includes the plurality of members 31a, 31b, 31c, and 31d including the hollow H extending along the longitudinal direction C1, and the tie bolt 31e extending along the longitudinal direction C1 of the rotating shaft 31 to sequentially penetrate through the hollow H of the plurality of members 31a, 31b, 31c, and 31d and to detachably couple the plurality of members 31a, 31b, 31c, and 31d to the impeller 21, and thus the inside of the rotating shaft 31 may be easily cooled and a cost for replacing parts of the rotating shaft 31 when broken may be reduced.

In the turbo compressor 100, the compressed gas channel 26 is spatially separate from the cooling air channel 41 to prevent the gas inside the compressed gas channel 26 from penetrating into the cooling air channel 41, the cooling fan 42 for forcibly circulating the cooling gas accommodated in the cooling air channel 41 is included, and thus the motor 30 may be efficiently cooled without pressure loss of the compression unit 20 and the cooling gas accommodated in the cooling air channel 41 may be forcibly circulated using the cooling fan 42.

In the turbo compressor 100, the cooling fan 42 is disposed at the rear end of the rotating shaft 31 and rotated by torque of the rotating shaft 31 and thus an additional motor for rotating the cooling fan 42 may not be required.

In the turbo compressor 100, the cooling water channel 51 is provided to exchange heat with the cooling gas accommodated in the cooling air channel 41, and thus a two-step cooling structure in which the cooling gas heated by the motor 30 is rapidly cooled by the cooling liquid may be implemented.

Although the journal bearing 34 is disposed between the thrust bearings 35 and the impeller 21 in the current embodiment, on the contrary, the thrust bearings 35 may be disposed between the impeller 21 and the journal bearing 34.

Although the thrust bearings 35 are disposed at the front end of the rotating shaft 31 in the current embodiment, instead, the thrust bearings 35 may be disposed at the rear end of the rotating shaft 31.

Although the turbo compressor 100 includes one impeller 21 in the current embodiment, a double turbo compressor in which impellers 21 are disposed at both ends of the rotating shaft 31 may also be applied.

Although the turbo compressor 100 has a closed structure in which the cooling air channel 41 is spatially separate from the compressed gas channel 26 to prevent the air inside the compressed gas channel 26 from penetrating into the cooling air channel 41 in the current embodiment, instead, an open structure in which a portion of the air compressed by the impeller 21 is introduced into the cooling air channel 41 and used as the cooling gas may also be applied.

Although cooling fins are not provided in the cooling air channel 41 in the current embodiment, the cooling fins may be additionally provided in the cooling air channel 41. In this case, the cooling fins may be provided integrally with the housing 10, or produced as a separate member and then coupled through press fitting or the like.

Although the cooling fan 42 is directly coupled to the rear end of the rotating shaft 31 in the current embodiment, the cooling fan 42 may be driven by a separate electric motor.

Although the bearings 34 and 35 are provided as foil air bearings in the current embodiment, another type of air bearings or various other bearings may be used.

A sealing means for airtightness is not described in the current embodiment, various types of sealing means may be used.

Figure 11:
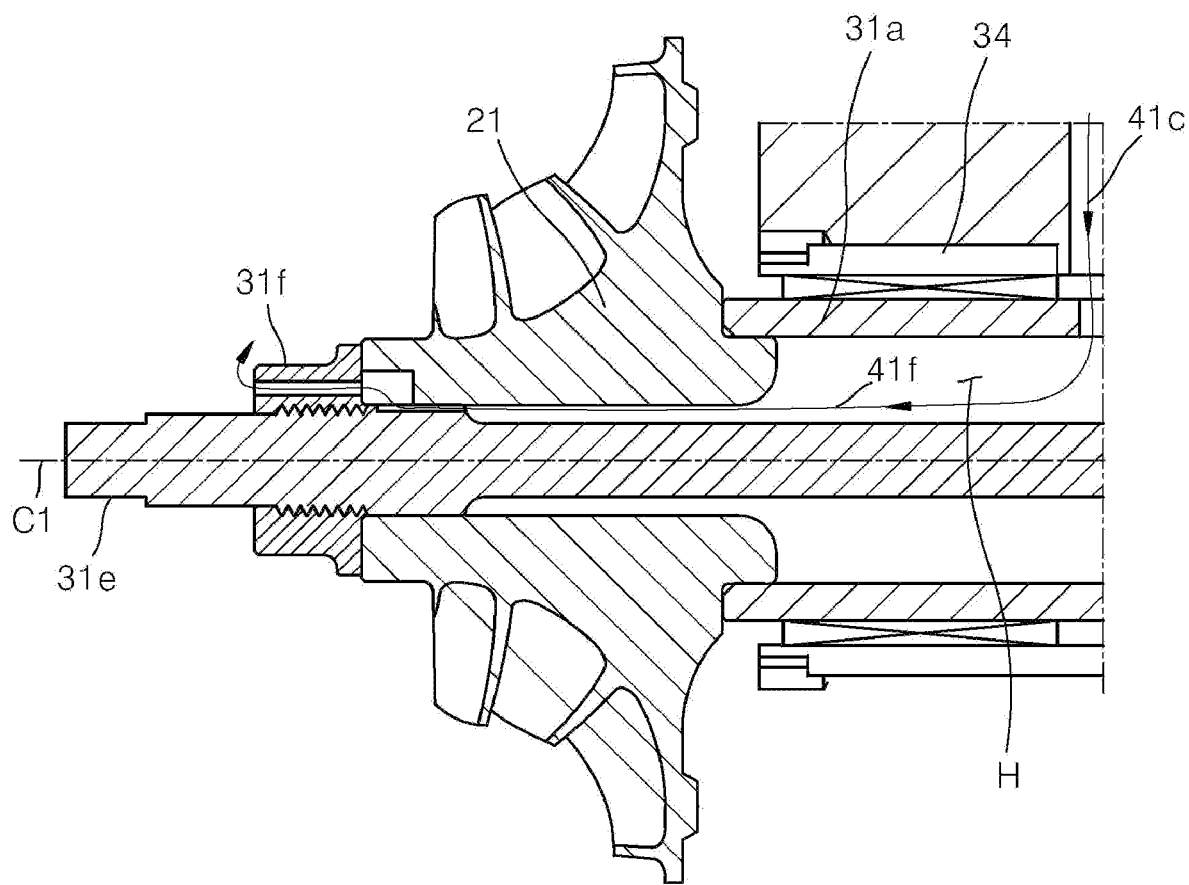
FIG. 11 is a view showing an outflow air channel of a turbo compressor according to another embodiment of the present invention.

Although the cooling gas accommodated in the inner air channel 41e penetrating through the hollow H of the rotating shaft 31 is not discharged to a front side of the impeller 21 in the current embodiment, an outflow air channel 41f through which the cooling gas accommodated in the inner air channel 41e is discharged to the front side of the impeller 21 as shown in FIG. 11 may be provided. When the outflow air channel 41f is provided as described above, a back pressure applied to the rear of the impeller 21 may be lowered and thus an axial load applied to the thrust bearings 35 may be reduced. In addition to the reduction in axial load applied to the thrust bearings 35, because an inlet pressure of the impeller 21 is low, an air flow may be formed between the compressed gas channel 26 and the cooling air channel 41 and thus the cooling effect may be additionally increased.

While the present invention has been particularly shown and described with reference to embodiments thereof, it will be understood by one of ordinary skill in the art that various changes in form and details may be made therein without departing from the scope of the present invention as defined by the following claims.

The invention claimed is:

1. A turbo compressor capable of compressing a gas and supplying the compressed gas to outside, the turbo compressor comprising:
   a compressed gas inlet through which the gas is sucked in;
   an impeller for compressing the gas introduced through the compressed gas inlet;
   a compressed gas outlet through which the gas compressed by the impeller is discharged to the outside;
   a compression unit comprising a compressed gas channel connected from the compressed gas inlet to the compressed gas outlet;
   a motor comprising a rotating shaft having an end coupled to the impeller, to rotate the impeller;
   a housing comprising a motor accommodation space for accommodating the motor;
   a cooling air channel provided to pass through the motor accommodation space and formed to circulate a cooling gas accommodated therein;
   a cooling water channel formed to circulate a cooling liquid capable of cooling the housing; and
   thrust bearings disposed at an end of the rotating shaft,
   wherein the cooling water channel comprises bearing cooling water channels disposed within a predetermined distance from the thrust bearings to cool the thrust bearings,
   wherein the rotating shaft comprises a thrust bearing runner corresponding to the thrust bearings,
   wherein the bearing cooling water channels are provided within a predetermined distance from the thrust bearing runner,
   wherein the bearing cooling water channels extend by a predetermined length along radial directions of the rotating shaft to allow the cooling liquid to flow along the radial directions of the rotating shaft such that the bearing cooling water channels cover a total area of front air channels of the cooling air channel and the thrust bearings, the front air channels being provided between the bearing cooling water channels and the thrust bearings and configured to allow the cooling gas to flow from an edge of an front end of the housing toward a center of the front end of the housing,
   wherein the bearing cooling water channels have a fan shape with an upper width located farther from the rotating shaft greater than a lower width located closer from the rotating shaft and are arranged along a circumferential direction of the rotating shaft.

2. The turbo compressor of claim 1, further comprising a journal bearing disposed between the impeller and the thrust bearings as a bearing supporting the rotating shaft,
   wherein the journal bearing is disposed under the bearing cooling water channels.

3. The turbo compressor of claim 2, wherein the thrust bearings and the journal bearing are air bearings.

4. The turbo compressor of claim 1, wherein the cooling air channel comprises air channels penetrating through the housing to cool the housing, and
   wherein the cooling water channel comprises water channels penetrating through the housing to cool the housing.

5. The turbo compressor of claim 4, wherein the cooling water channel is provided to exchange heat with the cooling gas accommodated in the cooling air channel, and
   wherein the air channels penetrating through the housing and the water channels penetrating through the housing extend along a longitudinal direction of the rotating shaft and alternately disposed along the circumferential direction of the rotating shaft.

6. The turbo compressor of claim 1, wherein the rotating shaft comprises a hollow extending along a longitudinal direction, and
   wherein the cooling air channel comprises an air channel penetrating through the hollow of the rotating shaft.

7. The turbo compressor of claim 1, wherein the rotating shaft comprises:
   a plurality of members comprising a hollow extending along a longitudinal direction; and
   a tie bolt extending along the longitudinal direction of the rotating shaft to sequentially penetrate through the hollow of the plurality of members and to detachably couple the plurality of members to the impeller.

8. The turbo compressor of claim 1, wherein the compressed gas channel is spatially separate from the cooling air channel to prevent the gas inside the compressed gas channel from penetrating into the cooling air channel, and
   wherein the turbo compressor further comprises a cooling fan for forcibly circulating the cooling gas accommodated in the cooling air channel.

9. The turbo compressor of claim 8, wherein the cooling fan is disposed at a rear end of the rotating shaft and rotated by torque of the rotating shaft.

10. The turbo compressor of claim 6, wherein the cooling air channel comprises an air channel through which the gas is discharged to a front side of the impeller after penetrating through the hollow of the rotating shaft.

* * * * *